United States Patent Office 2,960,779
Patented Nov. 22, 1960

2,960,779

OPTICAL RADAR SIMULATOR AND CROSS-SECTION ANALYZER

Walter L. Anderson, Falls Church, Va., and Clair E. Miller, San Rafael, Calif., assignors, by direct and mesne assignments, to the United States of America as represented by the Secretary of the Air Force Filed Feb. 14, 1958, Ser. No. 715,478

4 Claims. (Cl. 35—10.4)

This invention relates to devices for simulating radar systems and more particularly to apparatus and methods for simulating radar systems and photographing optical echo signals for analysis.

This device fulfills a need for relatively simple equipment for simulating a radar system with which the operator can set up experimental conditions and can also control the variables and which provides a method for investigating radar echoes from all aspect angles in a hemisphere. The term aspect angle as used in conventional radar terminology may be defined as the appearance of an object (target) as seen from a remote point (radar receiver). The device is an optical means for simulating a miniature radar system. A rotating model target reflects light from a light source (simulating a radar transmitter) into a conventional type photomultiplier as for example, that shown in Fig. 4 of United States Patent No. 2,842,673. The output signal from the photomultiplier varies the intensity of another light source (simulating the echo signal) directed onto a camera spinning with the model target. The second light source moves radially with respect to the center of the film and the result is a spiral trace on the camera film whose distance at any point from the center indicates the aspect angle and direction, and whose intensity indicates the strength of the echo from that angle.

An object of this invention is to provide means for optically simulating a radar system and for photographing the echo signals from all aspect angles in a hemisphere.

Another object of this invention is to provide a method for investigating radar echoes by optically simulating a radar system and photographing the echo signals from all aspect angles in a hemisphere.

Another object of this invention is to provide means for optically simulating a radar system and a method for investigating radar echo signals from all aspect angles in a hemisphere using conventional optical, electrical, and mechanical elements.

Further objects and advantages of this invention will be apparent from the following description and claims as exemplified by the accompanying drawings in which:

Figure 1:
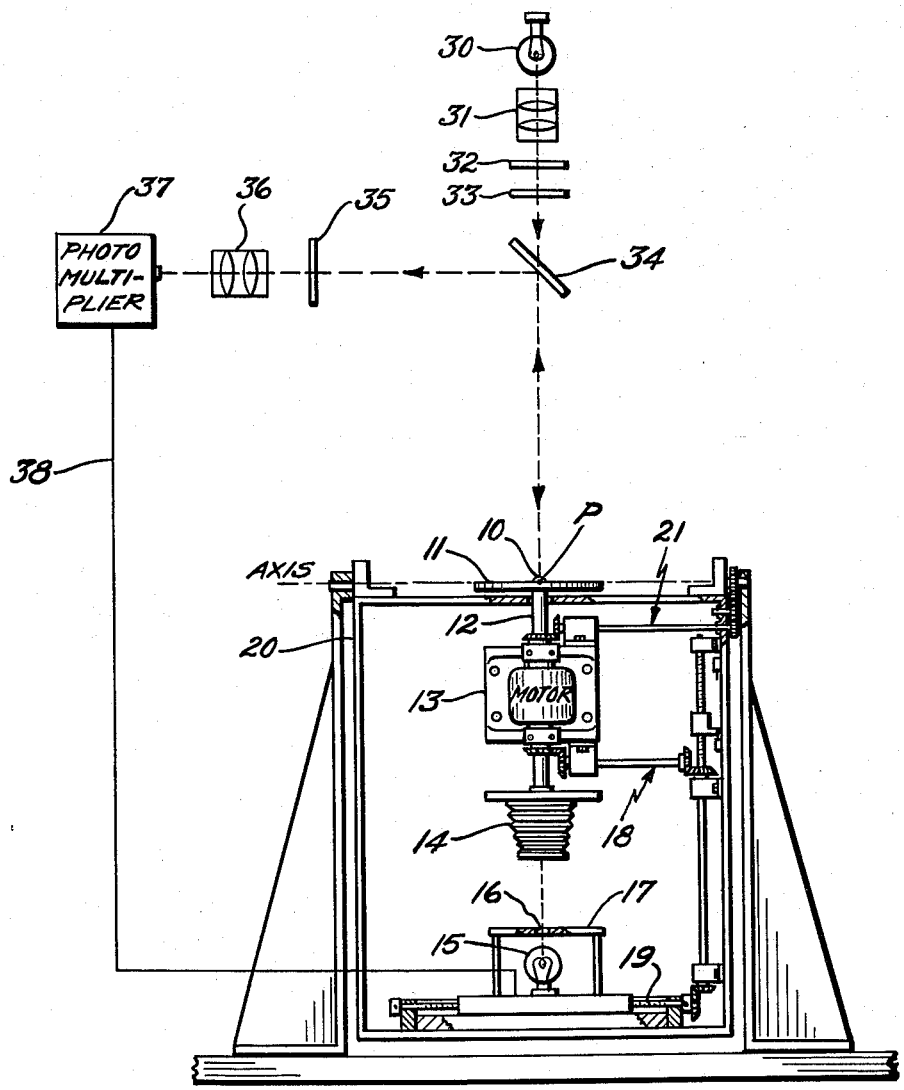
Fig. 1 illustrates a schematic drawing of an embodiment of the invention.
Figure 3:
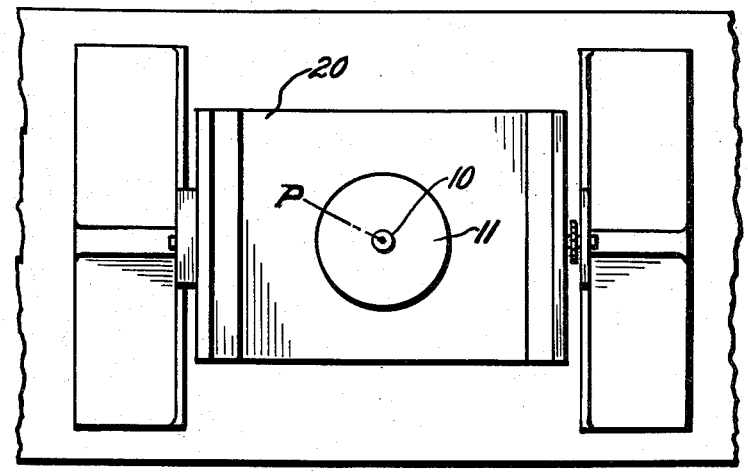
Fig. 3 is a sectional view through the axis of rotation of frame 20 looking down on target 10.

Referring now to Fig. 1:

The model target 10 to be scanned may be a hemisphere provided with differentially reflecting areas or it may represent an actual object. Said model target 10 is mounted at the center of turntable 11 which is rotated by shaft 12 of motor 13. Attached to the same shaft 12 is plateback camera 14 which views facsimile lamp 15 through hole 16 of shield 17. The pinpoint of light which is emitted through hole 16 is initially aligned with the center of the film plate of camera 14. As the camera 14 and turntable 11 rotate, facsimile lamp 15 and pierced shield 17 does not rotate therewith but moves radially with respect to the center of the camera film by suitable mechanical gear linkage 18 and worm 19. All the above mentioned apparatus is mounted on supporting frame 20 which is rotatable through 90° around the center line marked "Axis," the center of turntable 11, as a pivot point clockwise from the plane of the paper, as viewed in the drawing, and in synchronism with and by motor 13 and suitable gear linkage 21.

The simulated radar transmitter is light source 30 which projects light to the object 10 through collimating lens system 31 which parallelizes the beam, monochromatic filter 32, polarizing filter 33 and half-silvered mirror 34. An amount of light proportional to the area of the surface directly in line with the source and normal to the original ray is reflected from the object 10 then impinges on the mirror 34, passes through polarizing filter 35 and collimating lens system 36 which condenses and focuses the full intensity of light reflected from object 10 onto the photosensitive cell of photomultiplier 37. Photomultiplier 37 comprises a photosensitive electron tube whose current output varies linearly with the light striking it. Said current output, through lead 38, controls facsimile lamp 15 whose light intensity varies linearly with the current it receives. Hence facsimile lamp 15 is a simulated radar receiver whose light signal is a function of the light signal reflected from the model target 10.

As the object 10 is spinning 1 r.p.s., the whole supporting frame 20 is oscillated through 90° each minute around the center line marked "Axis" as a pivot and hence all aspect angles in a hemisphere are sampled by the light beam from light source 30. With the camera 14 spinning in unison with turntable 11, and the "echo" signal from the facsimile lamp 15 moving radially with respect to the center of the film, the shutter of the camera 14 is held open until the frame 20 has described an arc of 90° or any other predetermined arc and the "echo signal" from the model target is recorded on the camera film as a spiral trace. It is obvious that for best photographic results camera 14, facsimile lamp 15, and pierced shield 17 could be enclosed in a light tight enclosure not shown. It is apparent that for ease of operation frame 20 can be provided with a suitable counterbalance.

A definite relationship exists between the spinning of the turntable 11 and the rotation of the frame 20 around the "Axis." The spiral trace is controlled by the lateral movement of the facsimile lamp 15 and is directly proportional to the spinning turntable 11. Thus, since all of the movements are interrelated, after passage of a known time interval the distance of the spiral from the center or origin indicates, first, the position of the turntable with respect to its spinning axis and, secondly, the position of frame 20 as determined by the number of degrees of rotation. Assuming the target attached to the turntable to be an aircraft, this defines its attitude or position in space with respect to some fixed point. Now, speaking in conventional radar terminology, the aircraft can be said to be at a certain aspect angle having a certain directional heading; the aspect angle in this case meaning its appearance with respect to the light source 30 and the directional heading being the direction in which the model target is moving.

Figure 2:
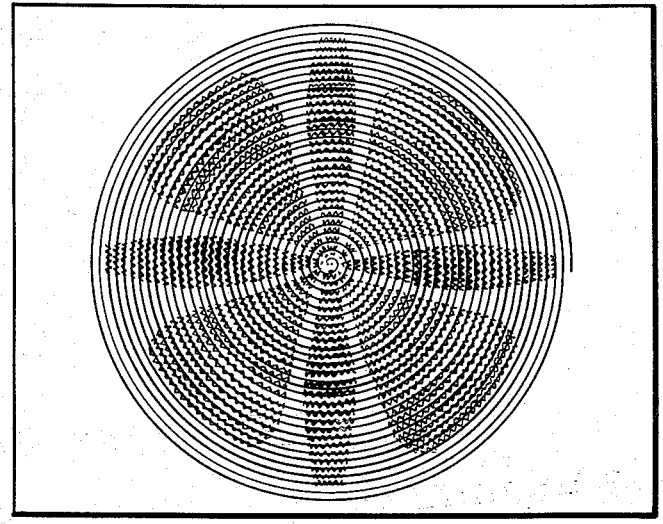
Fig. 2 illustrates a photographic record of the hemispherical scan.

Fig. 2 shows the spiral trace recorded on the camera film wherein the distance at any point from the center may be used to determine the aspect angle and direction, and the intensity indicates the strength of the echo from that angle.

As has been shown, the device is an optical means for simulating a miniature radar system. Since the signal varies with the nature and shape of the object, the direction, and the aspect angle, the device fulfills a need for equipment with which the operator can set up experimental conditions and can also control the variables.

The device provides a method of investigating radar echoes by optical simulation of a hemispherical scan which is a novel technique. The invention is useful to those not having access to real radar equipment and in particular it may be used to study photographically the radar echo from a model target by optically scanning the target from all aspect angles in a hemisphere surrounding it. The echoes from various types and shapes of objects can be analyzed from all aspect angles by studying the photographs of the echo trace, by projecting the trace onto a screen, or by plotting the intensities of the echoes as a third dimension on the spiral trace or the information on signal strength, direction and aspect angle can be forwarded electronically to an information center for further action. The device can be especially useful in a radar prediction program.

The film may be calibrated or superimposed on a calibrated scale indicating azimuth and aspect angle.

While the invention has been described with particular reference to specific embodiments thereof, it will be understood that the invention is not limited thereto. Many modifications may be made and it is therefore contemplated to cover by the appended claims any such modifications as may fall within the true spirit and scope of the invention.

The invention having been thus described, what is claimed and desired to be secured by Letters Patent is:

1. The method of recording a simulated oscilloscope pattern of a hemispherical radar scanning operation comprising the steps of projecting a beam of light from a light source onto an object to be scanned, transforming light reflected from said scanned object into electrical energy which is used to energize a second light source, rotating a camera and the second light source relatively to each other and to the first light source to produce the effect of a hemispherical scan of said object, and photographing the light emitted from said second light source.

2. A method for recording a simulated oscilloscope pattern of a hemispherical radar scanning operation comprising the steps of projecting a beam of light from a light source through an optical system to a rotating model target, reflecting said beam of light to a photomultiplier, converting said light to electrical energy for energizing a facsimile lamp, rotating said model target in unison with a camera having a photosensitive plate therein about an axis passing through the centers of said target and said camera, moving said facsimile lamp radially with respect to the center of the plate of said camera, simultaneously rotating said model target 90° in a plane perpendicular to said axis of rotation and about another axis passing through said target, and photographing the light of said facsimile lamp emitted through a pierced shield.

3. Apparatus for recording a simulated oscilloscope pattern of a simulated hemispherical radar scan comprising a light source, means for projecting light from said light source to an object to be scanned for simulating a radar transmitter, means for projecting light reflected from said object, means for converting the reflected light signal to electrical energy, means for converting said electrical energy to a light signal for simulating a radar receiver, means for photographing the light signal emitted from said simulated radar receiver, and means for rotating said object, said camera and said simulated radar receiver in relation to each other and to said simulated radar transmitter so as to produce a simulated hemispherical radar scan of said object.

4. Apparatus for recording a simulated oscilloscope pattern of a simulated hemispherical radar scan comprising a source of light, an optical system for projecting light from said source to a model target, a photomultiplier, an optical system for projecting reflected light from said model target to said photomultiplier, a facsimile lamp connected to said photomultiplier, said facsimile lamp emitting a beam of light of variable brightness corresponding to an output signal received from said photomultiplier, means including a plate for photographing the light signal emitted from said facsimile lamp, means for rotating the model target in unison with the photographing means about an axis passing through the center of the model target and the photographing means, means for moving said facsimile lamp radially with respect to the center of the plate of said photographing means, and means for simultaneously rotating said model target 90° in a plane perpendicular to said axis.

References Cited in the file of this patent

UNITED STATES PATENTS

| | | |
|---|---|---|
| 2,406,751 | Emerson | Sept. 3, 1946 |
| 2,505,793 | Rust et al. | May 2, 1950 |
| 2,524,847 | Springer | Oct. 10, 1950 |
| 2,526,682 | Mulberger | Oct. 24, 1950 |
| 2,539,498 | Waller | Jan. 30, 1951 |
| 2,578,939 | Moran | Dec. 18, 1951 |
| 2,603,777 | Ranger | July 15, 1952 |
| 2,777,215 | Amman | Jan. 15, 1957 |
| 2,871,578 | Faisandier | Feb. 3, 1959 |